July 5, 1938. F. A. HAYES 2,123,007
TRACTIVE PRESSURE MEANS FOR FRICTIONAL POWER TRANSMISSION MECHANISMS
Filed May 16, 1936 5 Sheets-Sheet 1
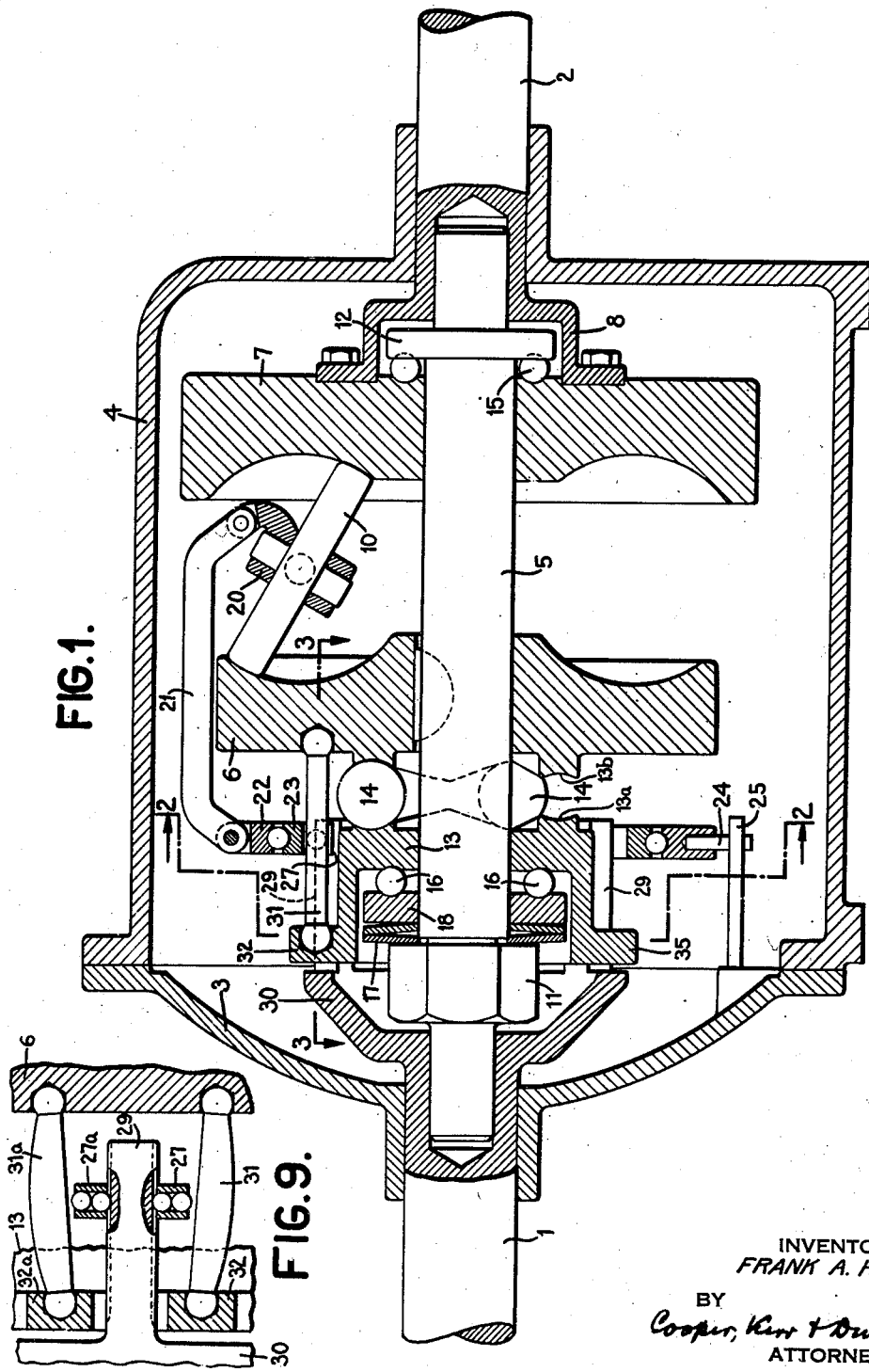
INVENTOR
FRANK A. HAYES
BY
Cooper, Kerr & Dunham
ATTORNEYS July 5, 1938.  F. A. HAYES  2,123,007
TRACTIVE PRESSURE MEANS FOR FRICTIONAL POWER TRANSMISSION MECHANISMS
Filed May 16, 1936   5 Sheets-Sheet 2
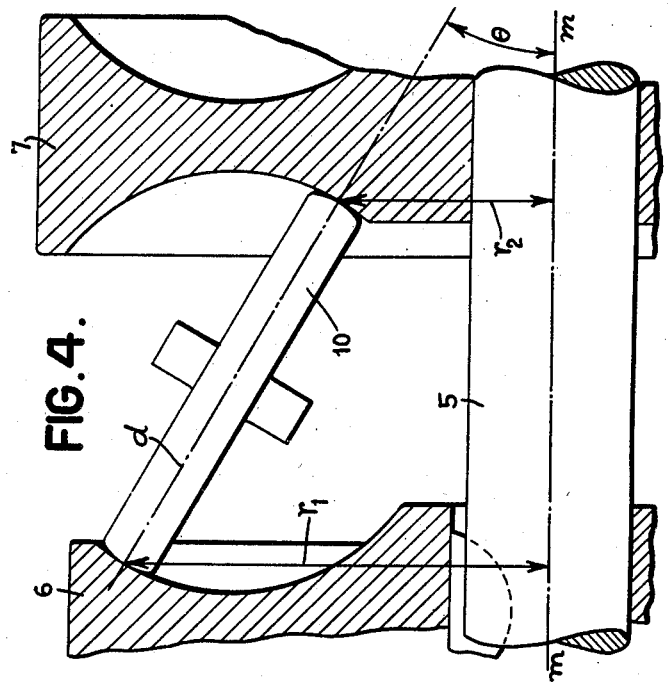
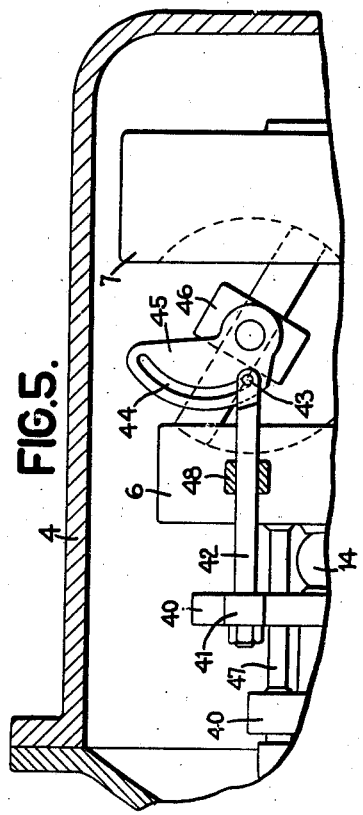
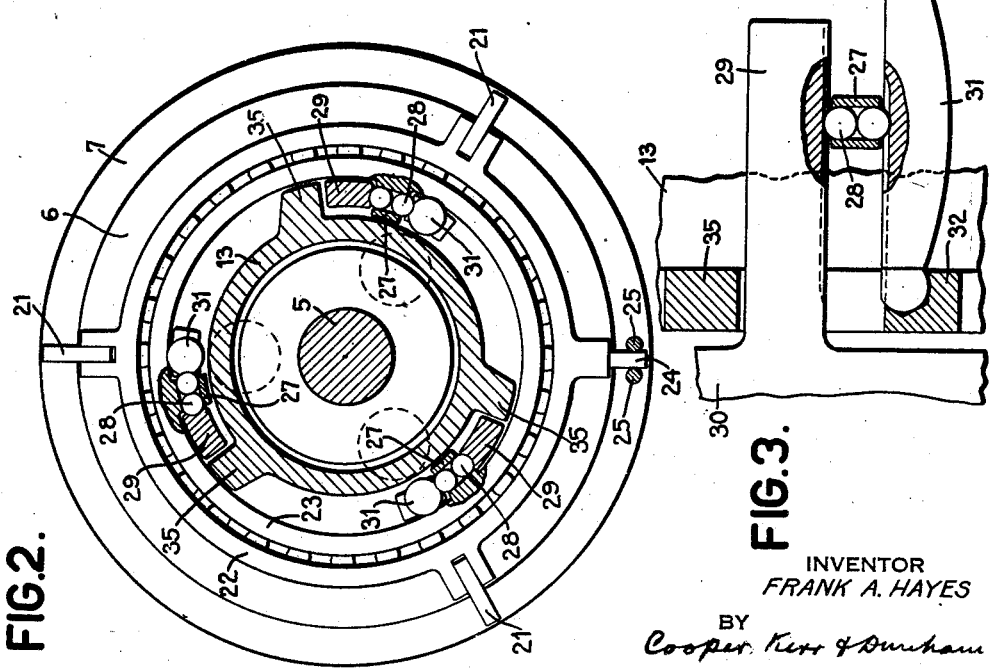
INVENTOR
FRANK A. HAYES
BY
Cooper, Kerr & Dunham
ATTORNEY

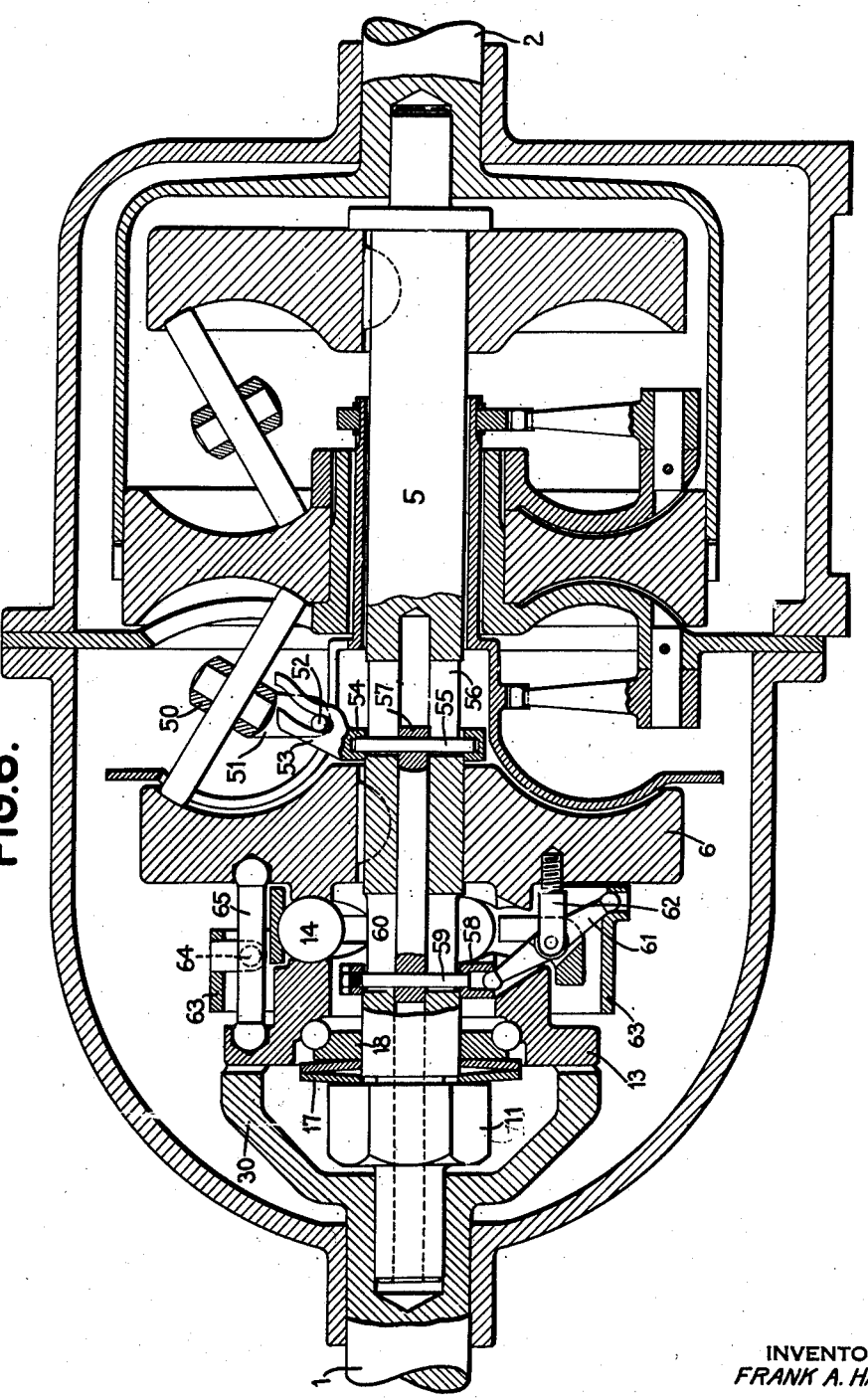

July 5, 1938. F. A. HAYES 2,123,007
TRACTIVE PRESSURE MEANS FOR FRICTIONAL POWER TRANSMISSION MECHANISMS
Filed May 16, 1936 5 Sheets-Sheet 4
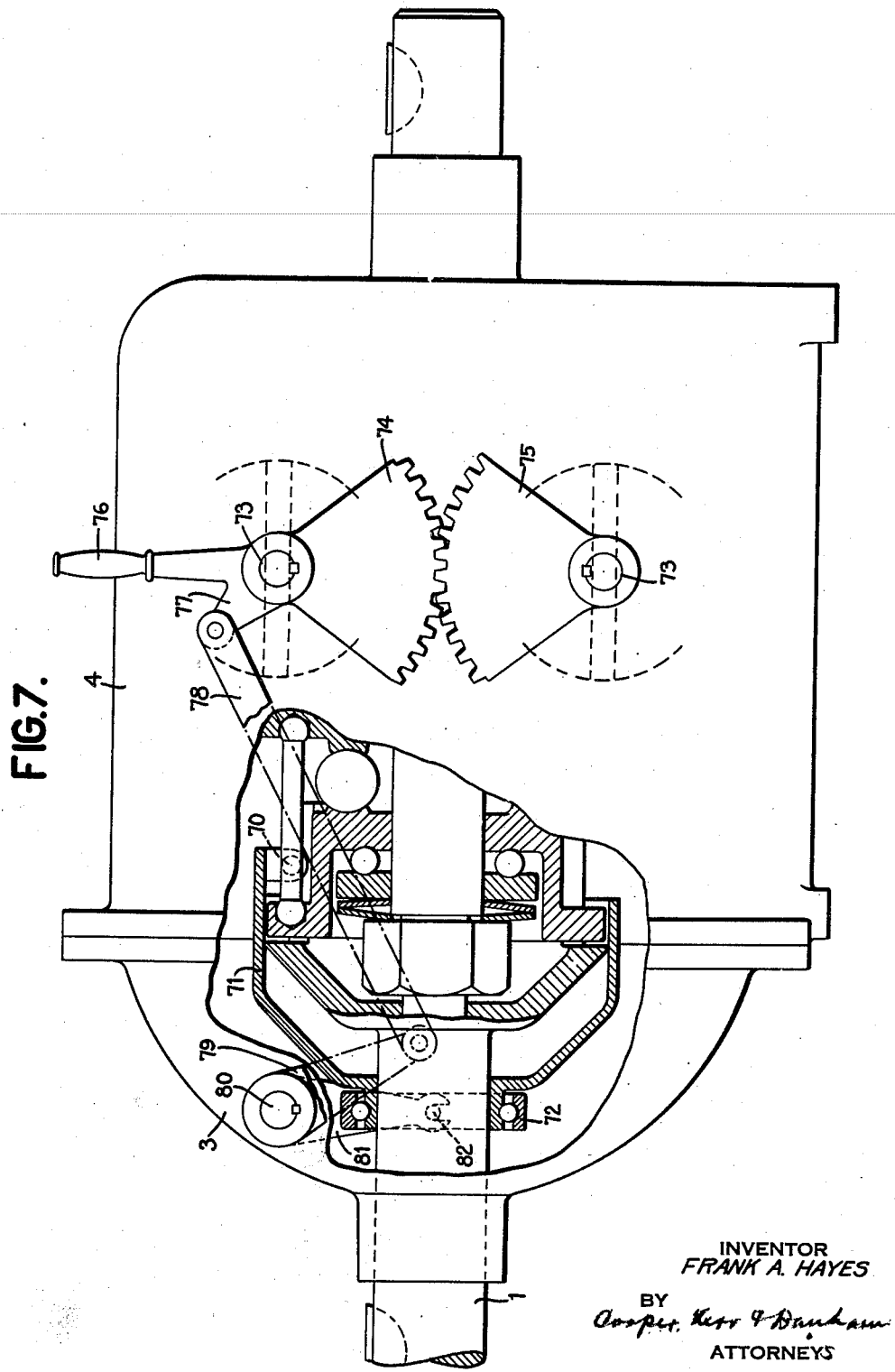
INVENTOR
FRANK A. HAYES
BY
ATTORNEYS July 5, 1938. F. A. HAYES 2,123,007
TRACTIVE PRESSURE MEANS FOR FRICTIONAL POWER TRANSMISSION MECHANISMS
Filed May 16, 1936 5 Sheets-Sheet 5

INVENTOR
FRANK A. HAYES
BY
Cooper, Kerr + Dunham
ATTORNEYS

Patented July 5, 1938

2,123,007

UNITED STATES PATENT OFFICE 2,123,007

TRACTIVE PRESSURE MEANS FOR FRICTIONAL POWER TRANSMISSION MECHANISMS

Frank A. Hayes, Middletown, N. J.

Application May 16, 1936, Serial No. 80,033
In Great Britain May 29, 1935

13 Claims. (Cl. 74—208)

In power transmission mechanisms dependent upon tractive friction between rotating members in rolling contact, the importance of providing pressures between the contacting surfaces which will give the friction necessary to prevent slippage of one member relative to another under all operating conditions, is well recognized. The device or mechanism for producing such pressure may be conveniently termed a "pressure device". A spring or other resilient means may be used for this purpose, but the most satisfactory form of device consists of balls or rollers working in cam grooves or recesses, through which the input, output, or reaction torque is applied to the transmission. Such a device can be designed to give a pressure which is to a certain extent proportional to the load, and which therefore not only insures against slippage but also provides a reduced pressure for light loads and thus tends to lessen the frictional losses and increase the life of the transmission. In a fixed ratio transmission, i. e., one in which the speed-ratio is not varied, a properly designed ball-cam pressure device is quite satisfactory, but in a variable speed roller transmission two other important factors come in to modify the action and the simple ball-cam pressure device can give even approximately perfect results at only some one particular speed-ratio. Of these other two factors one is the variation of the radii from the disc axis to the points of contact of the rollers on the discs, conveniently termed "contact radii". The other factor, arising in the toric disc or similar type of transmission mechanism, is the "angularity" of the rollers with respect to the discs. It is, in general, the angularity of the rollers that determines the speed-ratio of the mechanism.

It is the chief object of my present invention to provide a pressure mechanism which will take into account or compensate for the latter of these two factors, and preferably the other factors also, that is, the three factors of load, contact radius, and angularity, and so obtain the required pressure or a desired approximation thereto over all or over a wide range of operating conditions.

The great advantage of a pressure mechanism which can be constructed to provide the "required" or necessary pressure (and no more) under all conditions of operation will be at once seen from the fact that with hardened steel discs and rollers the fatigue life of the contact surfaces varies inversely as the 10/3 power of the pressure. That is, if W is the pressure, the fatigue life varies as $1/(W^{10/3})$. Thus if the pressure mechanism gives twice the required pressure at some particular ratio, the life at that ratio will be only about $\frac{1}{10}$ of what it would be with a pressure no greater than that required to maintain the necessary traction.

As one method for approximating the required pressure, it has been proposed to apply to the pressure device cam the torque reaction on the rollers themselves. In this way it is possible to make the pressure correct for the torque and also for the contact radius, but the method does not take into account the very important factor of roller angularity. With this type of pressure device the undesirable effect of change in the angularity of the roller may be somewhat lessened by using rollers of relatively large diameter, and swinging them through a small angle, but this is a very unsatisfactory compromise since it either narrows the speed-ratio range obtainable or lessens the number of rollers that can be used, and also increases the bulk and weight of the transmission and particularly the length, which is especially objectionable in automotive applications, where the length of the transmission is an important item. The importance of roller angularity as affecting the design of the pressure mechanism will be readily understood by any one who attempts to lay out a toric disc transmission with a wide range of speed-ratios. The roller should be as small as will meet the operating conditions and must be swung through as large an angle as practicable. 45° from the 1:1 speed-ratio position is quite a common low gear angle, and this would give an excess pressure of 41 per cent; and 60°, which has been successfully used, would result in 100 per cent excess pressure, with a pressure mechanism which does not take roller angularity into account.

With the ordinary cam-and-ball pressure device applied to one of the discs, the effect of roller angularity can be decreased over a relatively narrow angular range at either the high speed or low speed end of the speed-ratio range, and this possibility has been utilized in the past; but the excess pressure at the other end of the range is then very high in a transmission mechanism having a wide range of speed ratio, and the actual pressure may easily be two or three times the required pressure.

An object of this invention is therefore to provide means for obtaining on the rollers of a toric disc transmission mechanism an actual normal pressure, that is to say, a pressure in line with the contact diameters of the rollers, which is equal to or closely approximates the "required" pressure over a wide range of torque and speed ratio; or, in general, an actual pressure having any desired relation to the "required" pressure. By "contact diameters" is meant the diameters of the rollers between their points of contact with the discs.

A further object is to utilize as a part of such means a simple helical surface ball or roller cam pressure device.

Among the advantages obtainable with this invention are greatly increased life and capacity, resultant reduction in weight, bulk and cost, and a distinct improvement in efficiency over a wide range of speed-ratios.

In carrying out my invention in the preferred manner a torque member is employed, preferably rotatable, and mechanism is provided for transmission of the full torque between the torque member and the discs and rollers, said mechanism including means by which the torque is divided or apportioned, a part being transmitted directly between the torque member and the disc and roller assembly, and part between the torque member and the disc and roller assembly but through a pressure device or mechanism, preferably one of the ball (or roller) -and-cam type. The part transmitted through the latter path actuates the pressure device or cam mechanism to vary the contact pressure, while the other part has no effect upon such pressure. The division or apportionment of the torque is preferably effected in predetermined correspondence with the angular position of the rollers, and for this purpose I prefer a "beam" or lever mechanism in which the fulcrum of the lever (or the fulcrums when more than one lever is employed) is shifted as the rollers are rocked to change their angularity and thereby vary the speed-ratio of the transmission mechanism, the fulcrum or fulcrums being arranged to cooperate with the torque member. In such form of the invention one arm of the lever is connected with the ball-and-cam pressure device or mechanism and the other arm to the disc and roller assembly. Then as the roller is rocked toward the low speed-ratio angular position the fulcrum or loading point of the lever is shifted toward the cam-mechanism, thereby increasing the part of the torque which is transmitted through the pressure device or cam-mechanism and decreasing the part which is transmitted to or from the disc directly, with the result that as the roller is rocked toward the low speed position the pressure (for a given torque on the torque member) is increased. Conversely, as the roller is rocked toward the high speed position the torque transmitted through the pressure device is decreased and hence the contact pressure, for the given torque, is decreased also. It will be seen on reflection that by coordinating the movement of the fulcrum with the angular position of the roller an actual pressure practically equal to the required pressure can be obtained at all speed-ratio positions of the roller, and that the desired correspondence between fulcrum position and roller position can be obtained by a variety of devices. In one constructional form of the invention the roller carrier, in which the roller rotates and which rocks with the roller to vary the speed-ratio, is connected to the fulcrum by a simple link. With this form, even though the movement of the fulcrum be more or less harmonic, an approximation of actual pressure to required pressure can be obtained over a wide range of speed-ratios with an excess of actual over required of not more than about 10 per cent at any speed-ratio position of the rollers.

In another form of the invention the coordination of the movement of the fulcrum with the changing angular position of the rollers is obtained through the medium of a cam, in which case, by proper design of the cam, an even closer agreement of actual with required pressure is easily obtainable.

In any case the desired coordination, whatever it may be, of fulcrum position and roller angularity, can be secured by connection with the device or mechanism by which the rollers are rocked or caused to rock to vary the speed-ratio, especially when the part to which the connection is made has a definite position for every speed-ratio angle of the rollers, that is, when the part referred to is itself coordinated with roller angularity.

Various constructional embodiments of the invention are illustrated in the accompanying drawings, some in transmission mechanisms having a single set of rollers and some in mechanisms of the "duplex" type, that is, having two sets of rollers working in parallel, but it is to be understood that the invention is not limited in respect to the number of sets of rollers which the transmission may have; nor is it limited to planetary or nonplanetary rollers, or to rollers whose angularity is varied by "precession".

Referring now to the drawings:

Fig. 1 is a longitudinal view of a transmission incorporating one constructional form of the invention.

Fig. 2 is a transverse section of Fig. 1 on the line 2—2 showing the construction of some of the parts.

Fig. 3 is an enlarged view of the variable fulcrum beam mechanism of Fig. 1, on the line 3—3.

Figure 8:
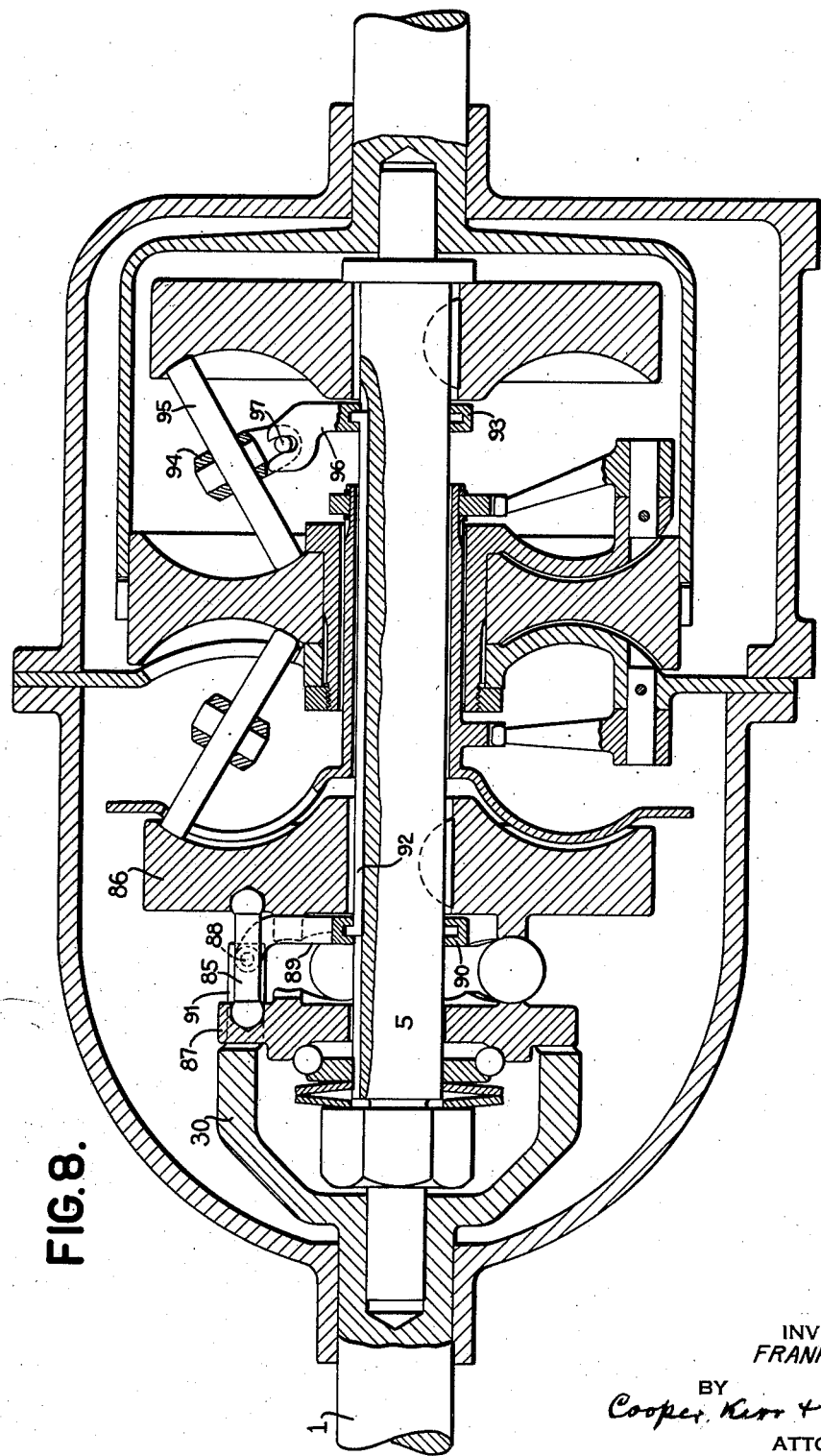

Fig. 4 is a sectional view, diagrammatic in character, showing two discs and one roller. In this figure, $r_1$, $r_2$ are the contact radii of the roller, that is, the radii from the disc axis $m$—$m$ to the points of contact of the roller on the discs. Line $d$, between the points of contact of the roller on the discs, is the contact axis or diameter of the roller, and angle $\theta$ (theta), between this diameter and the disc axis, is the roller angle or "angularity".

Fig. 5 is a detail plan view illustrating a simple form of the invention in which a cam is employed to vary the pressure in accordance with roller angularity.

Fig. 6 is a sectional plan view showing another embodiment of the invention in which a cam is employed.

Fig. 7 is a side view, partly in section, showing a form of the invention applied to a transmission having rollers of the non-precessing type, with the contact pressure under the control of a member which is a part of the means provided for changing the angularity of the rollers.

Fig. 8 is a view similar to Fig. 6 but showing another constructional form of the invention, particularly useful in but not confined to a "duplex" type of transmission mechanism.

Fig. 9 is a detail view similar to Fig. 3, showing a construction for apportioning the torque between the pressure device and the discs when the rotation is in either direction.

Referring now to Fig. 1: for convenience shaft 1 is assumed to be the input shaft, and 2 the output shaft, although the transmission may be driven from either end. The casing is made in two parts, 3 and 4. 5 is the main shaft of the transmission which carries the discs 6 and 7 and is journaled at its ends in shafts 1 and 2.

The driving or input disc 6 and the output disc 7 are mounted on shaft 5. The latter disc rotates freely on the shaft and is connected with the driven or output shaft 2, as by the flange 8. Roller 10 is shown in its high speed position. In practice two or more rollers would be used but I have shown only one to avoid unnecessary complication of the drawings. It will be understood that the speed-ratio of the mechanism depends upon the angular position of the rollers, and that change of angular position may be brought about in any way, as for example by the well known method of "precession" of the rollers. Shaft 5 has a nut 11 at one end and a ball race collar 12 at the other which act as abutments to carry the pressure between discs and rollers through the shaft. 13 is the pressure device cam. The pressure is carried from the helical surfaces or pockets 13a formed on this cam through the balls 14 to similar surfaces 13b on disc 6, whence the pressure is transmitted through roller 10 to disc 7 and thence through balls 15 to collar 12. The reaction pressure is carried from cam 13 through balls 16 and a race 18 to one or more springs 17 and nut 11. In a transmission having a single set of rollers, as in Fig. 1, either the input disc or the pressure-device cam, preferably the former, may be keyed to shaft 5. If neither is keyed to the shaft, the shaft floats and the bearings 15 and 16 divide their relative speed between them, thus reducing the maximum speed of each. Springs 17 are provided to insure no-load contact of the rolling members and are relatively weak so that they are completely compressed at low torque and have no further effect on the action of the pressure device. It is easily seen that relative movement of rotation between cam 13 and disc 6 causes balls 14 to roll up on the inclined surfaces of these parts and so separates them, first compressing springs 17.

The mechanism so far described is a simple torus disc variable speed transmission mechanism with one set of rollers and a ball-cam pressure device which provides an axial pressure proportional to torque or load but independent of the contact radii $r_1$ and $r_2$ (see Fig. 4) and of the angle $\theta$ which the roller makes with the disc axis. The total driving force F at the points of contact between rollers and discs is given by the formula $$F = T_1/r_1 = T_2/r_2 \quad (1)$$

where $T_1$ is the torque on shaft 1 and $T_2$ that on shaft 2. With a ball-cam pressure device or mechanism of the simple type above referred to, the axial pressure $W_a$ is directly proportional to $T_1$ and is given by the formula $$W_a = 2\pi T_1/L \quad (2)$$

where L is the lead of the helical surfaces of the pressure device. Assume now that W is the required axial pressure, and that the safe coefficient of adhesion between rollers and discs is $\mu$; and let $W_n$ be the required pressure normal to the toric surfaces of the discs. Then $$W_n = F/\mu \quad (3)$$

and $$W = W_n \cos\theta \quad (4)$$

from which we have, F being equal to $T_1/r_1$ by Equation (1), $$W = T_1 \cos\theta / r_1 \mu \quad (5)$$

Comparing Formula 5 with formula 2, we see that $W_a$ is a function of only one variable, $T_1$, the other factors in Formula 2 being constants; whereas W in Formula 5 is a function not only of $T_1$ but also of the additional variables $r_1$ and $\cos\theta$, the latter being a funciton of the angularity of the roller.

Referring to Figs. 1, 2 and 3: roller 10, journaled in a carrier 20, may be supported in any convenient way for swinging or rocking on an axis perpendicular to the axis of rotation of the roller. The swinging or rocking movement may be effected by precession on an axis parallel to the planes of the discs; or, preferably, on an axis inclined to the planes of the discs, as described in my United States Patent Nos. 1,865,102 and 1,919,218 and my British Patent No. 344,063. Pivoted at one end to carrier 20 is a link 21 pivoted at its other end to an annular member 22 constituting the outer race of a ball-bearing having an inner race 23. If the rollers are non-planetary the outer race is held from rotation in any suitable manner, as by a radial pin 24 and fixed guide pins 25 on opposite sides of the pin, but is free to move axially and carry with it the element 22—23, in response to speed-ratio changing movements of carrier 20 and roller 10, communicated to race 22 by link 21. The element mentioned therefore has a definite position for each speed-ratio position of the roller. Considering the roller positions shown in Fig. 1 as the high ratio position, the element comprising races 22, 23, and the interposed balls, will evidently move away from disc 6 as the speed-ratio decreases. Race 23 is provided with inwardly extending lugs 27 (see also Figs. 2 and 3) having openings or recesses containing two balls 28. These lugs are located between arms 29, projecting axially from the bell or enlarged end 30 of shaft 1, and levers or beams 31, pivotally cooperating with the disc 6 and with the radial lugs or projections 32 on cam 13. Balls 28 can therefore roll along beam 31 and so form a movable fulcrum or loading point for the beams. While a simple link connection with the roller carrier is shown for the moving fulcrums in response to change of roller angularity it is to be understood that other means can be employed to obtain any desired relation between the positions of the fulcrums and the angle (i. e., the speed-ratio position) of the roller.

Referring again to Figs. 1, 2 and 3, it will be seen that the fulcrums of the levers or beams 31 cooperate with the arms 29 extending from the bell 30 on the input shaft 1, and that it is through these fulcrums and arms that the input torque of shaft 1 is transmitted to the discs and rollers or the torque reaction of the load on the output shaft 2 is communicated to the input shaft 1. It will also be seen that the input torque is apportioned between the pressure device cam 13 and disc 6 by the beams, according to the position of the fulcrums. Thus with fulcrum 28 at the extreme left end of beams 31 (Figs. 1 and 3) all of the load from arms 29 will be communicated to the lugs or abutments 32 on cam 13, hence the full torque will be communicated to the cam to operate the pressure device and therefore maximum pressure for a given torque will result. As, however, the rollers rock and move the fulcrums out along the beam toward disc 6, less and less of the torque and load will be taken by or impressed upon the cam 13, the remainder being applied directly on disc 6, and hence the tractive pressure will be correspondingly decreased. For example if the fulcrum is midway between the ends of the beams as shown in Fig. 3, only half of the torque of shaft 1 will be transmitted to the discs and rollers through the cam 13 and the pressure will be reduced by half. At any position of the fulcrum, however, the pressure device by reason of its cam surfaces responds to all variations of the torque. By suitable means, say a simple cam carried by the roller carrier and bearing against a follower attached to a ring as illustrated in Fig. 5, for example, the positions of the fulcrums may be made to compensate exactly for variations in the value of $(\cos \theta)/r_1$ so that the actual pressure will be quite accurately equal to the required pressure at all speed ratios and all values of the torque. Even with a simple link connection such as shown in Fig. 1, which imparts motion of a more or less harmonic character to the fulcrums, the parts can be constructed so as to produce a pressure in quite close correspondence to the required pressure over a wide range of speed ratio. Thus in a transmission having a speed ratio of 4:1 between the input and output shafts at the lowest speed ratio position of the rollers and a ratio of 1:3 between the two shafts at the highest speed-ratio position,—the angular speed of the output shaft at the high speed ratio position of the rollers being therefore 12 times its angular speed at the low position,—an actual pressure over the entire range can be obtained with a maximum excess over the "required" pressure of not more than about 10 per cent of the latter.

Figs. 1, 2 and 3 show the device constructed for compensation in one direction of rotation only. In the reverse direction full torque is applied to the cam 13 by arms 29 (on bell 30 of the input shaft 1) coming in contact with lugs or projections 35 on the cam. For most uses of a transmission mechanism, reverse is only incidental or occasional, and the action of the pressure mechanism in reverse is relatively unimportant. If desired, however, the beam mechanism can be duplicated on the other side of arm 29 so that the device will compensate for roller angularity in both directions of rotation, as in Fig. 9, for example, in which the two beams 31, 31a, engaging the disc 6 and lugs 32, 32a, and adapted to cooperate with the movable fulcrums 27, 27a, are inclined to each other toward the ends engaging the pressure cam 13 so as to allow for movement of the cam to either of its extreme positions and insure that the loaded beam will be approximately parallel to the disc axis. It is to be noted that if nut 11 is adjusted so as to bring the loaded beams to parallelism with the disc axis under full torque, practically no effort will be required to operate the fulcrums since the only effort needed is to overcome the slight resistance of the balls 28 to rotation on themselves and on the beam and arm surfaces. The balls may be retained in lugs 27 in any suitable manner, such as slightly spinning or peening over the edges of the recess in which they are mounted but leaving them free to rotate.

Fig. 5 shows a form of the invention in which the movable fulcrum is operated by a cam, instead of by a link as in Fig. 1. By properly proportioning the cam slot, practically perfect compensation may be obtained so that the actual and required pressure will be substantially equal for all torques, contact radii and roller angles. In this figure, ball bearing outer race 40, corresponding to element or ring 22 of Fig. 1, is provided with bosses 41 to which are attached rods 42 the rightward forked ends of which carry pins 43 fitted in cam slots 44 of cams 45 attached to roller carriers 46. Ring 40 is therefore moved axially in response to changes in the roller angle and in such movement shifts the movable fulcrums (not shown in Fig. 5) along the beams or levers 47, thus varying the proportion of the torque which is applied by shaft 1 to the cam mechanism. In a transmission mechanism in which the rollers are non-planetary each rod 42 may have a fixed guide, as 48, fixed to any convenient stationary part, as for example the case or housing 4.

Fig. 6 shows a "duplex" transmission (i. e., one having two sets of rollers) in which the linkage for controlling the pressure-device torque is operated through a passage or bore in the shaft 5 instead of externally, thus providing a compact construction and avoiding the large annular member 22—23 of Fig. 1. Any suitable means for controlling the roller position (i. e., speed ratio) may be used but I prefer a control mechanism such as is shown in my copending application Serial No. 618,054, and my British Patent No. 392,589. In Fig. 6, roller carrier 50 has an arm 51 provided with a pin 52, which engages a cam slot in an arm 53 on a ring 54 which may be split or otherwise constructed for purposes of assembly. Ring 54 engages and moves axially a pin 55 extending through slot 56 in the shaft 5. Pin 55 is fitted in a stub shaft or rod 57 sliding in a bore in shaft 5 so that movement of cam 53 in response to change of roller angle is imparted to the rod. At its leftward end rod 57 is connected to a sliding ring 58 by means of a pin 59 extending through a slot 60 in shaft 5. Ring 58 is provided with recessed lugs engaging the ball ends of suitable levers, one of which is shown at 61, fulcrumed in a stud or clevis 62 carried by disc 6. The other ball end of the lever 61 fits in a hole or recess in a ring or drum 63, which carries the movable fulcrums 64 of the beams or levers 65 by which the torque is apportioned between the pressure device and the disc 6. It will be seen that the angular movement of the roller to vary the speed-ratio of the transmission mechanism is imparted to the fulcrum 64 through the instrumentality of the cam, rod, and other parts described.

Fig. 7 shows a construction similar to that of Fig. 1 but arranged for operation of the movable pivots or fulcrums by a part of the control mechanism provided for changing the transmission speed-ratio. The movable fulcrums 70 are carried by a drum 71 movable axially by a small ball bearing 72 sliding on shaft 1. Any suitable mechanism for controlling the speed ratio can be employed provided the control member which is operatively connected with the lever pivots 70 is at all times correlated with roller position. For simplicity, I have shown a simple well known mechanism for rocking two rollers. The roller carrier shafts 73, on the axes of which the carriers and rollers are rocked to vary the speed ratio, have keyed to them, outside the casing 4, toothed sectors 74 and 75, meshing with each other. Sector 74 is provided with a handle 76 for rocking the rollers and their carriers about the axes of the latter. Sector 74 is also provided with an arm 77 connected by a link 78 to an arm 79 keyed to rock shaft 80. The latter is mounted outside of the casing in a bearing carried by the latter and has keyed to it, inside the casing, a fork or yoke 81 the arms of which are slotted to engage pins 82 projecting from the non-rotating outer race of the ball bearing 72. The inner race of this ball bearing is integral with or connected to the drum 71 which carries the movable pivots or fulcrums 70, so that as the rollers are rocked by the handle 76 the fulcrums will be shifted, thus varying the proportion of the torque which is impressed on the pressure device.

It is to be noted that the invention is applicable to transmission mechanisms having planetary rollers as well as to those in which the rollers do not revolve about the disc axis. Thus to adapt the construction shown in Figs. 1, 2 and 3 to a planetary transmission the finger 24 and the pins 25 embracing it are simply omitted, to permit the ring or bearing 22—25 to revolve; links 21 being made stiff enough to carry ring 22 around with the roller carriers in the planetary movement of the rollers.

Still another way of shifting the fulcrums of the compensating beams is illustrated in Fig. 8, in which it is shown applied to a duplex transmission, though it can also be employed to advantage in a mechanism having a single set of rollers. In the form of the invention shown in Fig. 8 as in the forms illustrated in other figures there are preferably as many compensating beams and fulcrums as there are rollers in the first set. One beam or lever is shown at 85, cooperating with the disc 86 and the pressure device cam 87. The movable fulcrums, one of which is shown at 88, are carried by arms 89 extending outwardly from a ring 90 movable axially on the shaft 5. These fulcrums cooperate with arms 91 extending from the bell 30 on the shaft 1. The cam 87 may be provided with lugs or arms, not shown, such as those shown at 35 in Figs. 2 and 3, for the purpose explained above.

The ring 90 is interiorly grooved to receive a finger on one or more keys or rods 92 sliding in grooves in the shaft 5 and similarly cooperating at the other end with an interiorly grooved ring 93 which is moved axially on the shaft by the carrier 94 of roller 95 through the instrumentality of the cam 96 and pin 97.

Assuming that shaft 1 is the input shaft it will be seen that the rollers in Fig. 8 are shown in a high speed ratio position, with the fulcrums 88 in positions at about the middle of the torque-apportioning levers 85. As the rollers are rocked toward the low speed ratio position the key or rod 92 is shifted leftwardly by the ring 96, thereby shifting ring 90 and fulcrums 88 in the same direction (i. e., toward the cam 87), so as to increase the pressure applied to the discs and rollers by the ball-cam pressure device. It is to be noted that there is an advantage in adjusting the fulcrums from the second set of rollers instead of from the first set, as is done in Fig. 6, for example. In the latter figure the movement of the ring 54 is rightward as the rollers are rocked toward the low speed ratio position, and it is therefore necessary to provide means, as for instance the levers 61, to shift the fulcrums 64 leftwardly as the roller rocks toward the position mentioned; whereas in Fig. 8 the ring 90, carrying the fulcrums 88, is actuated directly by the cam 96 through the slide 92 without the intermediation of any means to give the fulcrums a movement opposite in direction to that of the cam.

It is to be understood that the invention is not confined to the constructions herein specifically described but can be embodied in other forms without departure from its spirit as defined by the appended claims.

I claim—

1. In a variable speed transmission mechanism, in combination, coaxial toric discs and interposed friction rollers cooperating therewith and movable angularly to vary the speed ratio of the transmission mechanism, torque-actuated cam means for applying tractive pressure on the disc and roller assembly, adjustable torque-apportioning means between the cam means and the disc and roller assembly, and means acting in predetermined correspondence with the angular position of the rollers to control the adjustment of the torque-apportioning means.

2. In a variable speed power transmission mechanism, the combination with coaxial toric discs and cooperating friction rollers, of a torque member, cam mechanism between the torque member and the disc and roller assembly for transmission of torque between said member and the disc and roller assembly and actuated by such torque to press the discs and rollers together, and lever means connecting the torque member with the disc and roller assembly and adapted to by-pass a part of the torque around the cam mechanism and directly between the torque member and the disk and roller assembly.

3. In a variable speed power transmission mechanism, the combination with coaxial toric discs and cooperating friction rollers, of a torque member, torque-actuated cam mechanism between the torque member and the disc and roller assembly to press the discs and rollers together, and lever means connecting the cam mechanism and torque member with the disc and roller assembly for apportioning part of the torque to the cam mechanism and part to the disc and roller assembly, said lever means having fulcrum means cooperating with the torque element and shiftable to vary the apportionment of torque.

4. In a variable speed power transmission mechanism of the toric disc and friction roller type, in combination, coaxial toric discs, friction rollers cooperating therewith and movable angularly to vary the speed ratio of the mechanism, a torque member, cam mechanism cooperating with the disc and roller assembly and with the torque member for actuation to apply tractive pressure on the discs and rollers in accordance with the torque impressed on the cam mechanism, means for apportioning part of the torque of said torque member to said assembly directly and part to said assembly through the cam mechanism, and means for controlling such apportionment in predetermined correspondence with the angular position of the rollers.

5. In a variable speed power transmission mechanism, the combination with coaxial toric discs and cooperating friction rollers, of a torque member, cam mechanism between the torque member and the disc and roller assembly for transmission of torque between said member and the disc and roller assembly and actuated by such torque to press the discs and rollers together, a plurality of levers between the cam mechanism and the disc and roller assembly and adapted to divide the torque therebetween, and fulcrums for said levers, cooperating with the torque member and determining by their position the part of the torque transmitted through the cam mechanism.

6. In a variable speed power transmission mechanism, in combination, coaxial toric discs, interposed friction rollers cooperating therewith and movable angularly to vary the speed ratio of the transmission mechanism, torque-actuated cam means for producing tractive pressure on the discs and rollers, levers and shiftable fulcrums associated with the cam means and the discs and rollers for varying the torque impressed on the pressure-applying cam means, and means actuated by angular movement of the rollers to shift said fulcrums.

7. In a variable speed transmission mechanism, in combination, coaxial toric discs and interposed friction rollers cooperating therewith and movable angularly to vary the speed ratio of the transmission mechanism, a torque member, torque-actuated cam means between the torque member and the disc and roller assembly for applying tractive pressure on the discs and rollers, lever means connecting the cam means and the disc and roller assembly and having shiftable fulcrums operatively associated with the torque member, and links connecting the rollers with said fulcrums to shift the latter as the rollers are moved angularly to vary the speed ratio of the transmission mechanism.

8. In a variable speed transmission mechanism, in combination, coaxial toric discs and interposed friction rollers cooperating therewith and movable angularly to vary the speed of the transmission mechanism, a torque member, torque-actuated cam means between the torque member and the disc and roller assembly for applying tractive pressure on the discs and rollers, torque-apportioning lever means between the cam means and the disc and roller assembly and having shiftable fulcrums operatively associated with the torque member, and means for shifting said fulcrums, having cam connection with the rollers for actuation by speed-varying angular movement of the rollers.

9. In a variable speed power transmission mechanism of the toric disc and friction roller type, in combination, coaxial toric discs, friction rollers cooperating therewith and movable angularly to vary the speed ratio of the mechanism, torque-actuated cam mechanism cooperating with the disc and roller assembly to apply tractive pressure thereon, torque-transmitting levers extending between the cam mechanism and the disc and roller assembly and spaced apart around the axis of the discs, shiftable fulcrums for the levers, a torque member having arms cooperating with the fulcrums for transmission of torque between the torque member and the levers, and means for shifting the fulcrums along said levers and arms.

10. In a variable speed power transmission mechanism of the toric disc and friction roller type, in combination, coaxial toric discs, friction rollers cooperating therewith and movable angularly to vary the speed ratio of the mechanism, torque-actuated cam mechanism cooperating with the disc and roller assembly to apply tractive pressure thereon, torque-transmitting levers extending between the cam mechanism and the disc and roller assembly and spaced apart around the axis of the discs, shiftable fulcrums for the levers, a torque member having arms cooperating with the fulcrums for transmission of torque between the torque member and the levers, means for shifting the fulcrums along said levers and arms, and means connecting the fulcrum shifting means and the rollers to shift the fulcrums as the rollers are moved angularly.

11. In a variable speed power transmission mechanism, in combination, a shaft, coaxial toric discs concentric therewith, friction rollers cooperating with the discs and movable angularly to vary the speed ratio of the transmission mechanism, a torque member, torque-actuated cam means between the torque member and the disc and roller assembly for applying tractive pressure on the discs and rollers, torque-apportioning lever means between the cam means and the disc and roller assembly and having shiftable fulcrums operatively associated with the torque member, and means for shifting said fulcrums, said fulcrum-shifting means including a member slidably carried by the aforesaid shaft and connected with the rollers for actuation by angular movement thereof.

12. In a variable speed power transmission mechanism, in combination, a shaft, coaxial toric discs concentric therewith, friction rollers cooperating with the discs and movable angularly to vary the speed ratio of the transmission mechanism, a torque member, torque-actuated cam means between the torque member and the disc and roller assembly for applying tractive pressure on the discs and rollers, torque-apportioning lever means between the cam means and the disc and roller assembly and having shiftable fulcrums operatively associated with the torque member, and means for shifting said fulcrums, comprising a sliding member carried by said shaft and connected with the fulcrums and having cam connection with the rollers for actuation by speed-varying angular movement of the rollers.

13. In a variable speed power transmission mechanism of the toric disc and friction roller type, in combination, coaxial toric discs, friction rollers cooperating therewith and movable angularly to vary the speed ratio of the mechanism, torque-actuated cam mechanism cooperating with the disc and roller assembly to apply tractive pressure thereon, torque-transmitting levers extending between the cam mechanism and the disc and roller assembly and spaced apart around the axis of the discs, shiftable fulcrums for the levers, a torque member having arms cooperating with the fulcrums for transmission of torque between the torque member and the levers, and means for shifting the fulcrums along said levers and arms, said fulcrum-shifting means having cam connection with the rollers for actuation by angular movement thereof.

FRANK A. HAYES.